Figure 1:
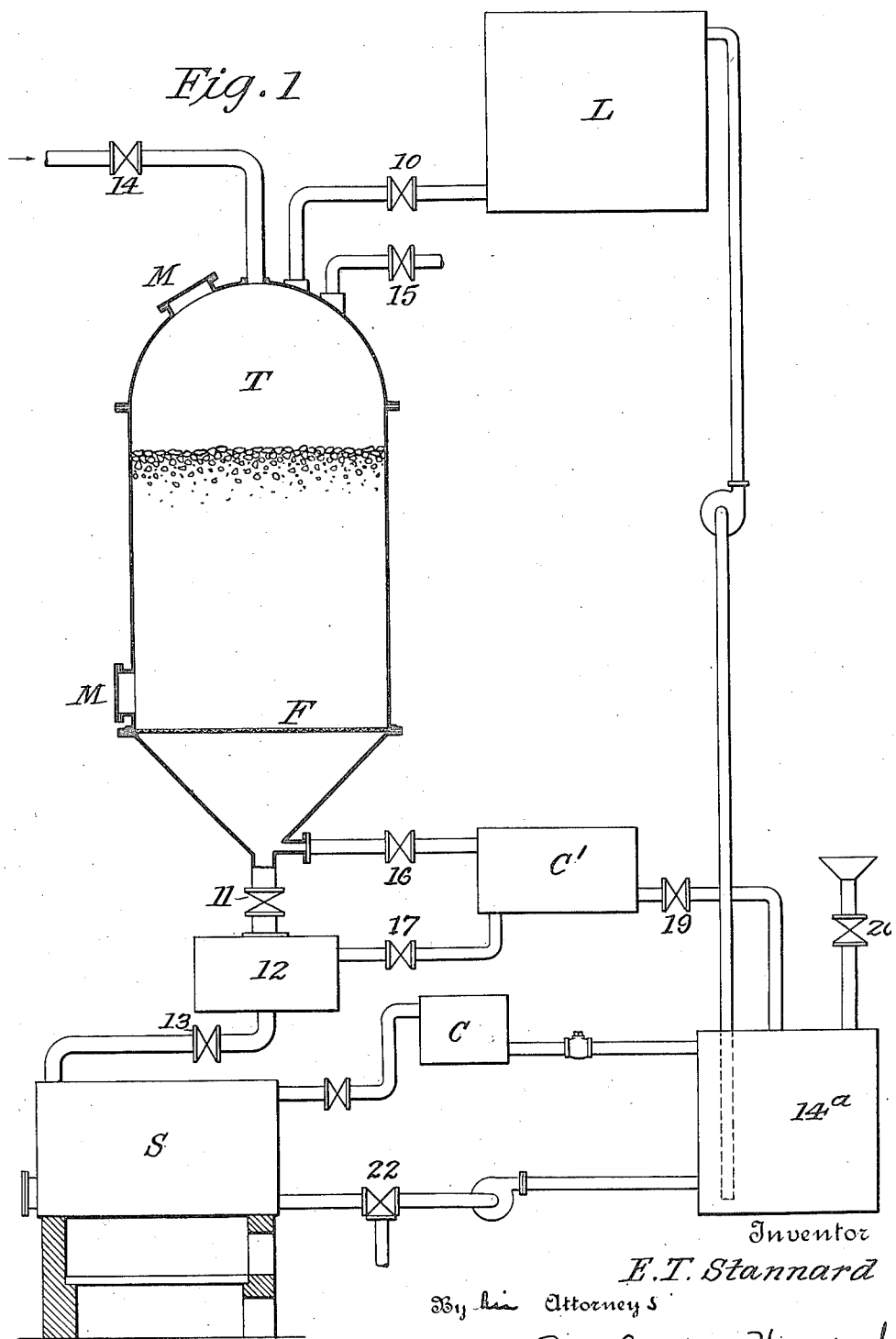

UNITED STATES PATENT OFFICE.

EARL T. STANNARD, OF KENNECOTT, TERRITORY OF ALASKA, ASSIGNOR TO KENNE-COTT COPPER CORPORATION, OF NEW YORK, N. Y., A CORPORATION OF NEW YORK.

PROCESS OF EXTRACTING METALS FROM ORES.

1,238,951.  Specification of Letters Patent.  Patented Sept. 4, 1917.

Application filed August 7, 1916. Serial No. 113,488.

*To all whom it may concern:*

Be it known that I, EARL T. STANNARD, a citizen of the United States, residing at Kennecott, Territory of Alaska, have invented certain new and useful Improvements in Processes of Extracting Metals from Ores, of which the following is a full, clear, and exact description.

This invention relates to an improved process of extracting metal from ores, and is particularly adapted for use in leaching processes where a volatile or semi-volatile solvent is employed. Until now, it has not been practical to employ strong or concentrated volatile solvents for leaching on a commercial scale, because the losses of the expensive reagents from volatilization and absorption by the ore or tailings leached have increased as the solvent increased in strength. On the other hand, when weak or dilute solvent solutions are used the losses are not so great, but the solvent power of the solution is so diminished that large volumes must necessarily be employed, and the leaching period must be lengthened in order to obtain satisfactory extractions.

The whole problem, therefore, in the case of volatile solvents, has been the working out of some process whereby they could be used in concentrated or strong solutions without the loss by volatilization and absorption heretofore incident to their use. The present invention is, in short, specially intended to render possible the use of a relatively small total volume of a strong or concentrated solvent solution, instead of a large total volume of weak or dilute solvent solution hitherto found necessary.

With reference to the ores which may be treated by the new process, it may be observed that, while the invention is applicable to the leaching of any ore, the application of the discovery will be here described in detail with reference to the treatment of an ore containing 1.5% copper in the oxid or carbonate form. And, further, the description to follow will assume the use of ammonia or an ammonium salt as the solvent employed, although in the use of this discovery any solvent may be utilized.

In the example described in more detail I will assume that 600 tons of such an ore is being treated.

In the drawing:

Figure 1 illustrates somewhat diagrammatically one form of apparatus in which my improved process can be carried out.

Figure 2:
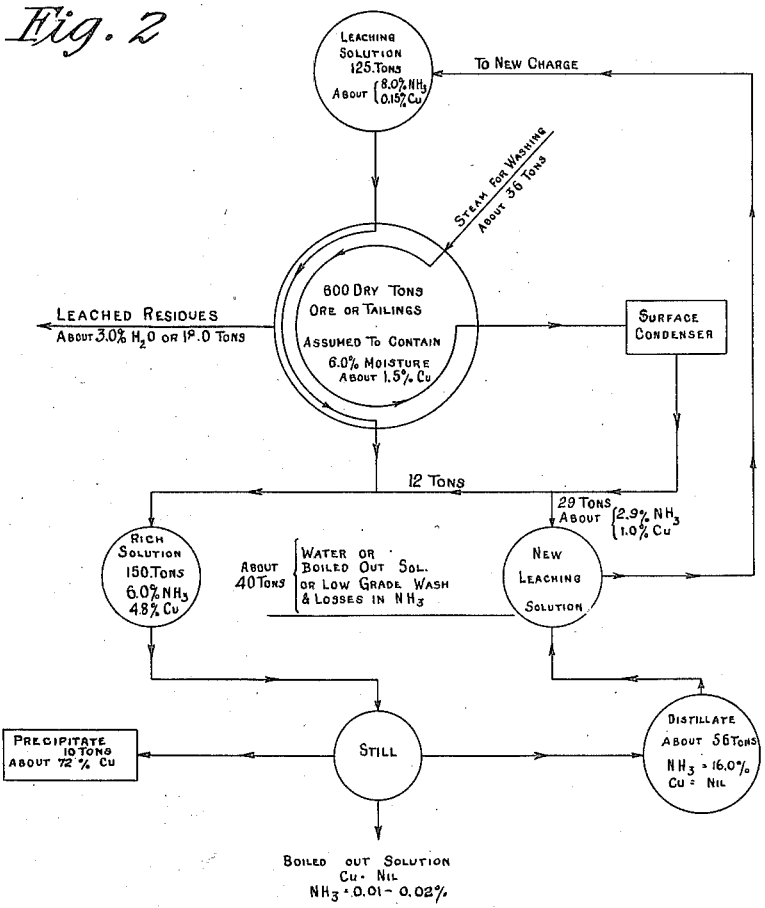

Fig. 2 is a diagrammatic view which shows clearly the complete cycle of operations. This diagrammatic view shows the quantities involved in the various steps for the example explained in the specification. This view also shows the steps of regeneration and solvent recovery which forms one feature of my improved process.

In more detail, the apparatus is of the form widely used in leaching processes, and is will be understood can be modified in various ways, as I make no claim to the specific apparatus employed.

The leaching tank T is preferably provided with a dome-shaped top to allow an even distribution of the steam over the top of the material therein. The tank is designed so that it may be closed and tightly sealed when in use, to minimize the loss of volatile reagents and to prevent the escape of steam. The tank contains the usual filter cloth F at the bottom and has suitable filling and ore removing manholes M. If desired, the tank may be lagged to prevent loss of heat and condensation of the steam.

While it is perhaps impossible to state with absolute precision the relation of the ammonia to be employed to the copper content of the charge to be leached, my investigation, both on a small and later on a large scale, has shown that roughly 1.1 pounds of available ammonia must be used for each pound of copper contained in the charge, in order to arrive at an economical extraction. For example, in the case of the 600-ton charge now being discussed, the copper being 18,000 pounds, approximately 20,000 pounds of available ammonia must be used. This amount of ammonia would be carried by 125 tons of an 8% solution, or by 200 tons of a 5% solution, or by 500 tons of a 2% solution. The advantages of using the small-volume solution, when considered with regard to the cost of installation and of operation, are self-evident.

It is not to be understood from the foregoing that the strength of the solution to be used is limited necessarily to 8%. Sufficient solution should be used, of course, to cover completely the entire charge of material to be leached, but the amount of the solution required will obviously depend upon the size to which this material has been reduced. In the case assumed here, the sizing of the tailings necessitates the use of about 125 tons of solution for each 600-ton charge, the 600-tons named being the net weight of the tailings, exclusive of the weight of the moisture contained in them. But, were the tailings of such a size as to give less interstitial space, the volume of the solution required would necessarily be reduced. It is to be noted in this connection that the strength of the solution may be increased in proper proportion to the decreased volume of the solution. Thus, in tailings of such sizing as to allow the use of, say, 100 tons of solution in the tank here referred to, a solution of 10% ammonia might be employed. But the ratio of ammonia to copper need not be affected by the volume of the solution. And in general, in other cases than that of ammonia and copper, the ratio of the solvent to metal should be preserved.

The ore or tailings, having been reduced to a suitable size for leaching (and assumed in this description to contain 6% moisture when the tank is filled and ready for the solvent solution) is charged into the covered leaching tank T, preferably by some mechanical device (not shown) adapted to thoroughly mix and distribute the charge. The tank T is then closed and valve 10 opened to permit about 125 tons of leaching solution containing 8% $NH_3$ and 0.15% Cu to flow from the supply tank L into tank T. The pipes may be so arranged that the solution will be admitted at the bottom of tank T if conditions make this method more desirable.

After contact with the charge for a sufficient length of time to give an economical extraction, the rich copper bearing solution is drawn off through valve 11 through the tank 12, valve 13 to the still S. Here the solution is distilled to recover black copper oxid as a precipitate and to drive off the ammonia which may be condensed in the condenser C and absorbed in water and returned to the auxiliary supply tank 14ª. These steps are well known in leaching processes, and need not be described in detail.

It is at this stage of the cycle that my new process is introduced. The leaching solution having been wholly or partly withdrawn from the leaching tank, steam under pressure is admitted by opening valve 14. The introduction of the steam may be preceded by the introduction of wash water through valve 15. The steam distributes over the top of the charge in the tank and because of its pressure, will gradually penetrate the charge, the uniformity of the penetration depending primarily upon the uniformity of charge as in any other washing process. The rapidity of the penetration varies with the amount of steam pressure, and among other things, with the depth, nature and temperature of the charge.

Upon contact with the charge, the temperature of which is here assumed to be normal, the steam condenses, the condensation being most pronounced in the cooler parts of the charge which are in contact with the steam, and decreasing as the temperature of the charge increases. The water resulting from this condensation gravitates through the charge, and in its downward course gathers the copper and ammonia remaining from the withdrawal of the previously-applied leaching solution or solutions, thus washing the leached residues comparatively free from dissolved copper as well as from much of the ammonia. In the earlier stages of this condensation process, the water descending through the charge becomes richer and richer in ammonia and copper, until the bottom of the receptacle is reached; but as the steam wash progresses, the percolating water becomes, of course, increasingly poorer in the solvent and copper.

In the use of this new steam process, practically no precipitation of the dissolved metal takes place in the leaching tank. More or less precipitation would doubtless result from the contact of live steam with the metal-bearing solvent but this result is overcome by the formation of water in the tank. The condensation of the steam, first at the top and then at successively lower levels of the charge, results in the formation of an ample supply of water, which, passing downward through the leached material, washes it comparatively free of such portion of the rich, metal-bearing solution as has not already been drawn off. In this way, the metal is mostly carried out before the solution is appreciably affected by the heat of the steam.

The condensate, which is relatively rich in copper-bearing solution, is drawn off and added to the solution in tank 12. The condensate may pass directly through valve 11 to tank 12, or valve 11 may be closed and the condensate permitted to flow through valve 16, condenser C', valve 17 and back to tank 12. From the tank 12 the condensate may be admitted to still S by opening valve 13.

After the rinsing process by the condensed steam, the water (condensate) is succeeded downwardly by the live steam itself, which, because of its greater power for penetrating the charge and for carrying volatile solvents, takes up practically all of the reagents not carried out of the charge by the percolating water. In the case here assumed, the ammonia remaining in the charge after the wash has been completed averages about 28 lbs. or roughly 1/20 of a pound per ton of material leached. Continuing the steam wash would decrease the amount of ammonia left in the charge, but would not be necessarily profitable.

After the thorough penetration of the steam downward through the charge, the steam and effluent liquids (which are now hot) are led through the condenser C'. Here the steam is condensed, and the liquid and condensate are cooled at the same time so as to effect absorption of ammonia carried into the condenser by the steam. Valves 11 and 17 are closed and valve 19 is open, so that the condensed steam and ammonia can flow from the condenser to the auxiliary supply tank 14ª, where they are again used to form part of the make-up solution for the next leaching charge.

When an analysis shows the aforesaid condensate to be satisfactorily low in ammonia, the steam may be closed off from the tank by shutting valve 14, and the remaining pressure, if any, be released, after which the leached residues are ready for withdrawal. Upon the removal from the tank of the leached contents for disposal as waste matter, it will be found that the steam has left them warm, and in such a condition that they promptly dry upon contact with the outer air and are susceptible to very easy handling.

The process explained does not necessarily involve the idea of a single application of the solvent solution used. If the nature of the individual case requires it, the charge may be subjected to a second or even additional treatment of the solution. Nor is it essential that the steam be immediately applied to the charge while the solution is still in the tank, or while it is being withdrawn. An intermediate wash may be used, following the total or partial withdrawal of the solution, or, if desired, the entire solvent solution may be drawn off, before steam is admitted to the receptacle.

The amount of steam required in any given case will depend upon the temperatures, as well as upon the nature and sizing of the ore being treated, the solvent employed, and the depth of the charge. In the case here assumed, an average application of 36 tons of steam to the 600-ton charge has been found adequate for the treatment by an ammoniacal solution of the copper tailings described.

Attention is directed to the original utilization, through this discovery, of the three principles of water, pressure, and temperature in the washing of the charge and the recovery of the solvent and metal. Because of the combination of these elements, a material portion of the solvent which would otherwise remain in the minute recesses of the charge and be lost, is carried out of the charge by the steam, thereby overcoming the difficulty, largely inherent in other processes, resulting from the absorption of the solvent by the fine sand and slime contained in the charge.

As previously explained, in the final step of the leaching process the rich leaching solution and copper-carrying condensate is distilled in the still S. About 150 tons of solution are handled in the still precipitating 10 tons of copper oxid containing about 72% copper. The distillate from the still amounts to about 56 tons, and contains about 16% $NH_3$. The boiled-out solution from the still, a portion of which may be used as make-up for the next leaching solution, contains about .01% to .02% $NH_3$. The condensed steam from condenser C' which flows to auxiliary tank 14ª weighs about 29 tons and contains approximately 2.9% of $NH_3$ and 1.% copper. Sufficient new solvent to compensate for the losses in the previous operations is added to the auxiliary tank 14ª through the valve 20. The solution in this tank is then pumped up to the elevated supply tank L.

The make-up solution which is pumped from tank 14ª to L can be augmented with the boiled out solution from the still S by opening valve 22, or this solution may flow from the still and be discarded if desired, or this solution may be used for washing purposes and admitted to tank T through valve 15.

The diagrammatic view, Fig. 2, shows clearly the cycle of operations, together with the approximate quantities handled in the various steps of the process. This figure clearly illustrates the recovery of the volatile solvent (in this case ammonia) which is effected by the steam. It is to be understood that the quantities given are merely for purposes of illustration, and that my invention is not limited to the particular quantities shown and described, nor to the particular arrangement of apparatus.

What I claim is:

1. The process for leaching ores which consists in treating a mass of ore with a volatile or semi-volatile solvent; withdrawing the solvent and recovering the metal therefrom, recovering the volatile reagent from the solvent, passing steam through the charge and washing the metal bearing solutions therefrom by means of the condensate, and thereafter condensing the steam and recovering the reagent entrapped by the steam in its passage through the charge.

2. The herein described process of washing leached ores which consists in passing steam through the leached ore and thereby condensing a part of the steam, continuing the application of steam to the ore until the condensate has thoroughly washed the ore and then condensing the steam which has passed through the ore to recover the reagent which the steam has absorbed from the ore.

3. The herein described process for the recovery of metals from ores by a leaching process which consists in treating the ore with a semi-volatile solvent and then washing the leached ore with steam substantially as described.

4. The herein described process for recovering metals from ores by leaching which consists in treating the ore with a volatile or semi-volatile solvent, removing the solvent from the ore, passing steam through the ore whereby the condensate therefrom washes the ore of the metal bearing solvent, continuing the treatment with steam after the mass of ore is heated and condensation no longer takes place and thereafter condensing the steam to recover the volatile reagent used in leaching.

5. The process of recovering reagents used in leaching from masses of treated ores, which consists in passing steam through the treated ores, washing the ore with the condensate from the said steam, adding the condensate and the metal bearing solutions carried thereby to the previously withdrawn treating solution, then condensing the steam which passes through the ore after the condensation has ceased and then recovering the reagent from the condensed steam.

6. The process of washing leached ores with steam which consists in passing steam through the masses of ores thereby condensing the steam and washing the ore partly with the condensate and partly with the live steam, whereby smaller volumes of stronger leaching solutions may be utilized, substantially as described.

In testimony whereof I affix my signature in the presence of two subscribing witnesses.

EARL T. STANNARD.

Witnesses:
J. C. MORGAN,
H. B. BRIMNER.